(12) United States Patent
Park et al.

(10) Patent No.: US 9,297,944 B2
(45) Date of Patent: Mar. 29, 2016

(54) RESIN COMPOSITION FOR OPTICAL FILM AND COMPENSATION FILM USING THE SAME

(71) Applicant: LG CHEM, LTD., Seoul (KR)

(72) Inventors: Jun-Wuk Park, Daejeon-si (KR); Sang-Min Kwak, Daejeon-si (KR); Jun-Geun Um, Daejeon-si (KR); Nam-Jeong Lee, Daejeon-si (KR); Suk-Il Youn, Daejeon-si (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 13/981,595

(22) PCT Filed: Sep. 21, 2012

(86) PCT No.: PCT/KR2012/007610
§ 371 (c)(1),
(2) Date: Jul. 24, 2013

(87) PCT Pub. No.: WO2013/051802
PCT Pub. Date: Apr. 11, 2013

(65) Prior Publication Data
US 2014/0071530 A1    Mar. 13, 2014

(30) Foreign Application Priority Data

Oct. 5, 2011  (KR) .................. 10-2011-0101279
Sep. 17, 2012 (KR) .................. 10-2012-0102983

(51) Int. Cl.
*G02B 5/30* (2006.01)
(52) U.S. Cl.
CPC .......... *G02B 5/3083* (2013.01); *B32B 2457/202* (2013.01)

(58) Field of Classification Search
None
See application file for complete search history.

(56) References Cited

U.S. PATENT DOCUMENTS

| | | | |
|---|---|---|---|
| 2007/0292680 A1 * | 12/2007 | Nakayama et al. | ........... 428/332 |
| 2008/0266493 A1 | 10/2008 | Yonezawa et al. | |
| 2009/0275718 A1 | 11/2009 | Um et al. | |
| 2011/0109966 A1 | 5/2011 | Yu et al. | |
| 2013/0023618 A1 * | 1/2013 | Miyake et al. | ................ 524/456 |

FOREIGN PATENT DOCUMENTS

| | | | |
|---|---|---|---|
| JP | 2008-276208 | | 11/2008 |
| JP | 2008276208 A | * | 11/2008 |
| JP | WO2011090200 | * | 7/2011 |
| KR | 10-2000-0045221 A | | 7/2000 |
| KR | 10-2002-0054688 A | | 7/2002 |
| KR | 10-0408109 | | 11/2003 |
| KR | 10-2009-0090553 A | | 8/2009 |
| KR | 10-2010-0025171 A | | 3/2010 |
| KR | 10-0974978 B1 | | 8/2010 |
| KR | 10-2011-0038689 A | | 4/2011 |
| WO | 02/053642 | | 7/2002 |
| WO | 2011090200 A1 | | 7/2011 |

* cited by examiner

*Primary Examiner* — Gwendolyn Blackwell
*Assistant Examiner* — Anthony J Frost
(74) *Attorney, Agent, or Firm* — Dentons US LLP

(57) ABSTRACT

Provided are a composition for an optical film comprising 40 wt % to 94 wt % of an acrylic resin; 5 wt % to 40 wt % of a styrene-acrylonitrile copolymer having a weight-average molecular weight less than 1,000,000; and 1 wt % to 20 wt % of an ultra-high molecular weight styrene-acrylonitrile copolymer having a weight-average molecular weight ranging from 1,000,000 to 9,000,000, and an optical film using the composition.

11 Claims, No Drawings

RESIN COMPOSITION FOR OPTICAL FILM AND COMPENSATION FILM USING THE SAME

This application is a national stage entry of International Application No. PCT/KR2012/007610, filed on Sep. 21, 2012, which claims priority to Korean Patent Application Nos. 10-2011-0101279, filed on Oct. 5, 2011 and 10-2012-0102983 filed on Sep. 17, 2012 with the Korean Patent Office, all of which are incorporated herein in their entirety by reference.

TECHNICAL FIELD

The present invention relates to a resin composition for an optical film and a compensation film using the same, and more particularly, to a resin composition for an optical film having excellent mechanical properties and optical properties, suitable for a compensation film for an in-plane switching (IPS) mode, and a compensation film using the resin composition.

BACKGROUND ART

Liquid crystal displays have been in widespread use as optical display devices, due to lower power consumption and ease of portability due to their lower volume and lighter weight in comparison to cathode ray tube displays. In general, a liquid crystal display is operated in such a manner that polarizing plates are installed on both sides of an liquid crystal cell filled with liquid crystals, an alignment direction of liquid crystals in the liquid crystal cell changes according to the presence of an electric field applied to the liquid crystal cell, and as a result, light emitted from the liquid crystal cell is selectively transmitted or blocked by the polarizing plate. Currently, liquid crystal displays having various modes have been developed in order to secure clear images and wide viewing angles, and typical examples may be double domain twisted nematic (TN), axially symmetric aligned microcell (ASM), optically compensated blend (OCB), vertical alignment (VA), multidomain VA (MVA), surrounding electrode (SE), patterned VA (PVA), in-plane switching (IPS), and fringe-field switching (FFS) modes. Each mode has its own inherent liquid crystal alignment and its own inherent optical anisotropy. Meanwhile, light perpendicularly incident and light incident in an inclined angle on the liquid crystal cell have different retardation values due to optical anisotropy of the liquid crystal cell, and, as a result, the light incident in an inclined direction may not be entirely transmitted or blocked by the polarizing plate. Thus, a contrast ratio may decrease or a gray scale inversion may occur. Therefore, various compensation films are currently used in order to compensate for retardation due to the optical anisotropy of the liquid crystal cell and characteristics of each compensation film required according to the mode of the liquid crystal cell are different from one another.

Since horizontally aligned liquid crystals having a positive permittivity anisotropy are used with respect to an IPS mode liquid crystal display, optical anisotropy in a tilt angle in an unactuated state is lower than that of other modes, and thus, it is commonly known in the technical field to which the current invention pertains that a wide viewing angle at a predetermined level or more may only be secured by using an optically isotropic protective film. However, even in this case, light leakage according to changes in an angle between absorption axes of a first polarizer and a second polarizer in the tilt angle and an accompanying decrease in contrast may also occur. In general, the first and second polarizers disposed on both sides of the liquid crystal cell are arranged so as to allow their absorption axes to be orthogonal to each other and thus, light is completely blocked in front in an unactuated state. However, the greater the tilt angle in an inclined direction is, the greater the geometrical angle between the absorption axes of two polarizers is. Therefore, light may not be completely blocked and light leakage may occur.

Recently, in line with large-sized, high-grade flat panel displays, an achievement of a perfect wide viewing angle is also required for IPS mode liquid crystal displays, and for this purpose, tilt of axes between the polarizers according to the tilt angle must be compensated for by using an appropriate retardation film. In general, it is commonly known that a retardation compensation layer satisfying a condition of $n_x > n_z > n_y$ is required. Where, $n_x$, $n_y$, and $n_z$ denote refractive indices of the film in each direction, and x, y, and z directions respectively denote a direction having the highest refractive index in a film plane, a direction perpendicular to the x direction in the film plane, and a thickness direction. The retardation film having birefringence may be impossible to be obtained by using typical uniaxial and biaxial stretching processes and thus, special methods of three-dimensionally controlling a refractive index, such as a method of inducing excessive shrinkage of width during stretching by using a shrinkage film and a method of applying a strong electric field to a stretched film, have been suggested. However, to date there have been limitations in continuously producing a film having a wide width due to various technical and equipment problems.

Therefore, a structure formed of a multilayer film having two or more layers is practically suggested for a retardation film for an IPS mode. A typical structure may include a structure having liquid crystals vertically aligned on an A-plate prepared by uniaxial stretching of a polymer film having a positive birefringence, such as polycarbonate or a cycloolefin-based polymer film. However, since a liquid crystal alignment layer is prepared by coating a transparent support with low-molecular weight or high-molecular weight rod-type liquid crystal molecules at a thickness of a few microns, not only excessive coating process costs may occur, but relatively large non-uniformity in a retardation value may also be generated due to the minor difference in coating thicknesses, and optical defects may be generated due to foreign objects such as dust particles remaining on a surface of a coating base film or existing in a liquid crystal solution. Therefore, in order to address the foregoing limitations in liquid crystal coating, the present researchers suggested a structure stacked with a (−)C-plate prepared by coating a (+)B-plate prepared through stretching of an acrylic film with a polymer material having a positive birefringence (Korean Patent Application Laid-Open Publication Nos. 10-2009-0090553 nd 10-2010-0025171).

However, with respect to a stretched polymer film using an acrylic resin, optical properties, proccessability, and durability may generally be excellent, but toughness may be low. Accordingly, a method of charging an impact modifier, such as a rubber elastomer, was previously suggested in order to improve toughness of an acrylic resin. However, since this method may decrease a degree of optical transmittance and may generate haze, the method is not suitable for an acrylic resin used in an optical film. Also, with respect to an acrylic resin, a high retardation value may not be obtained even by stretching, because optical anisotropy of a main chain may be low. Therefore, only the acrylic resin itself may be difficult to be used as a viewing angle compensation film.

DETAILED DESCRIPTION OF INVENTION

Technical Problem

An aspect of the present invention provides a resin composition for an optical film having excellent mechanical properties, especially toughness, and optical properties suitable for a compensation film for an in-plane switching (IPS) mode, and a compensation film using the resin composition.

Technical Solution

According to an aspect of the present invention, there is provided a composition for an optical film comprising: 40 wt % to 94 wt % of an acrylic resin; 5 wt % to 40 wt % of a styrene-acrylonitrile copolymer having a weight-average molecular weight less than 1,000,000; and 1 wt % to 20 wt % of an ultra-high molecular weight styrene-acrylonitrile copolymer having a weight-average molecular weight ranging from 1,000,000 to 9,000,000.

A content of acrylonitrile in the styrene-acrylonitrile copolymer having a weight-average molecular weight less than 1,000,000 may be in a range of 15 wt % to 26 wt %.

A content of acrylonitrile in the ultra-high molecular weight styrene-acrylonitrile copolymer may be in a range of 15 wt % to 26 wt %.

The acrylic resin may be a copolymer of a (meth)acryl-based monomer and a cyclic based monomer.

The cyclic based monomer may be maleic anhydride, maleimide, glutaric acid anhydride, glutarimide, lactam, or a derivative thereof.

The styrene-acrylonitrile copolymer having a weight-average molecular weight less than 1,000,000 may include an alpha-methyl styrene unit.

The ultra-high molecular weight styrene-acrylonitrile copolymer having a weight-average molecular weight ranging from 1,000,000 to 9,000,000 may include an alpha-methyl styrene unit.

The acrylic resin may include a styrene unit, in particular, an alpha-methyl styrene unit.

According to another aspect of the present invention, there is provided an optical film prepared by biaxial stretching of the composition for an optical film.

The stretching may be performed at a temperature ranging from Tg to (Tg+20° C.)

The biaxial stretching may be performed at a machine direction (MD) stretching ratio ranging from 1.5 to 2.0 and at a transverse direction (TD) stretching ratio ranging from 2.0 to 4.0.

A thickness of the optical film of the present invention may be in a range of 20 μm to 150 μm.

An in-plane retardation value of the optical film may be in a range of 50 nm to 200 nm.

A value of $R_{th}/R_{in}$ of the optical film may be in a range of 1.0 to 2.0.

The optical film may have an optical transmittance of 90% or more and a haze value of 2.5% or less.

The optical film of the present invention having the foregoing characteristics may be usefully employed as an in-plane switching (IPS)-liquid crystal display (LCD) compensation film.

Effects of Invention

When a resin composition for an optical film of the present invention is used, an optical film having low haze and excellent optical transparency as well as greatly improved toughness may be prepared. Therefore, cunic defects, in which local irregularities are generated in an interfacial adhesion layer between a polarizer and a protective film due to denting, compression, bending, and surface protrusions of the protective film during preparation of a polarizing plate using a typical acrylic film as a protective film, or fracture may be inhibited and thus, a failure rate may be greatly improved.

Also, in the case that an optical film is prepared by using the resin composition for an optical film of the present invention through biaxial stretching, optical properties suitable for an IPS mode compensation film may be obtained.

Best Mode for Invention

Hereinafter, embodiments of the present invention will be described in detail. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

A resin composition for an optical film of the present invention comprises: (1) a (meth)acrylic resin, (2) a styrene-acrylonitrile copolymer having a weight-average molecular weight less than 1,000,000, and (3) an ultra-high molecular weight styrene-acrylonitrile copolymer having a weight-average molecular weight ranging from 1,000,000 to 9,000,000.

In the present specification, a "copolymer" denotes two or more monomers included as a repeating unit, where the configuration thereof is not particularly limited, and it must be understood as a concept including any type of copolymer, e.g., an alternating copolymer, a block copolymer, a random copolymer, and a graft copolymer.

The (1) (meth)acrylic resin is for securing optical properties and durability, and in the present invention, polymers well-known in the art may be used as the (meth)acrylic resin. For example, a homopolymer or a copolymer of a (meth)acryl-based monomer, a copolymer of a (meth)acryl-based monomer and an aromatic vinyl-based monomer, a copolymer of a (meth)acryl-based monomer, an aromatic vinyl-based monomer, and an acid anhydride, and a copolymer of a (meth)acryl-based monomer and a cyclic based monomer may be used, and in particular, the copolymer of a (meth)acryl-based monomer and a cyclic based monomer, among these polymers, may be used.

A compound having a double bond between conjugated carbons and a carbonyl group of an ester group is suitable for the (meth)acryl-based monomer and a substituent thereof is not particularly limited. The (meth)acryl-based monomer described in the present specification includes an acrylate derivative as well as acrylate and must be understood as a concept including alkyl acrylate, alkyl methacrylate, and alkyl butacrylate.

Specifically, one or more acryl-based monomers selected from the group consisting of methyl acrylate, ethyl acrylate, methyl methacrylate, ethyl methacrylate, methyl ethacrylate, and ethyl ethacrylate may be used as the (meth)acryl-based monomer, and for example, methyl methacrylate (MMA) may be used in particular.

A monomer having a structure, in which a benzene nucleus or vinyl group is substituted or non-substituted with one or more alkyl groups having $C_1$ to $C_5$ or halogen groups, may be used as the aromatic vinyl-based monomer. For example, one or more styrene-based monomer selected from the group consisting of styrene, α-methyl styrene, p-methyl styrene, and vinyl toluene may be used.

A carboxylic acid anhydride may be used as the acid anhydride and a multivalent carboxylic acid anhydride being monovalent or divalent or greater may be used.

Maleic anhydride, maleimide, glutaric acid anhydride, glutarimide, lactam, or a derivative thereof may be used as the cyclic based monomer, and for example, a maleimide-based monomer may be used. The maleimide-based monomer may include N-cyclohexylmaleimide, N-phenylmaleimide, N-methylmaleimide, N-butylmaleimide, or a derivative thereof, but the maleimide-based monomer is not limited thereto, and for example, N-cyclohexylmaleimide or a derivative thereof may be used in particular. A content of the cyclic based monomer among the copolymer of (meth)acryl-based monomer and the cyclic based monomer may be in a range of 1 wt % to 50 wt % to reduce a haze value of the film.

Meanwhile, the acrylic resin may include a copolymer having a styrene unit, in particular, an alpha-methyl styrene unit. In the case of including the copolymer having an alpha-methyl styrene unit, an effect of improving heat resistance may be obtained.

In the composition of the present invention, a content of the acrylic resin may be in a range of about 40 wt % to about 94 wt % based on a total content of the composition and for example, may be in a range of about 50 wt % to about 90 wt %. In the case that the content of the acrylic resin is less than 40 wt %, high transparency and high durability of the acrylic polymer may be insufficiently manifested, and in the case that the content of the acrylic resin is greater than 94 wt %, a desired retardation film may be difficult to be prepared due to insufficient manifestation of retardation.

Also, a weight-average molecular weight of the acrylic resin composition may be in a range of about 50,000 to about 500,000 in consideration of heat resistance, proccessability, and productivity, and a glass transition temperature thereof may be 100° C. or more and less than 200° C. In the case that the glass transition temperature is less than 100° C., heat resistance may be insufficient and thus, deformation of the film and changes in retardation may be facilitated during a process of preparing the polarizing plate. In the case that the glass transition temperature is 200° C. or more, melt proccessability may generally decrease.

Next, the composition of the present invention includes the (2) styrene-acrylonitrile copolymer having a weight-average molecular weight less than 1,000,000.

The styrene-acrylonitrile copolymer having a weight-average molecular weight less than 1,000,000 (hereinafter, referred to as "low molecular weight styrene-acrylonitrile copolymer") is for providing negative birefringence to the optical film, and a content thereof may be in a range of about 5 wt % to about 40 wt % based on the total content of the composition and for example, may be in a range of 10 wt % to 30 wt %. In the case that the content of the low molecular weight styrene-acrylonitrile copolymer is less than 5 wt %, a desired retardation value may not be obtained, and in the case that the content of the low molecular weight styrene-acrylonitrile copolymer is greater than 40 wt %, a glass transition temperature of the total resin composition may decrease to thus adversely affect heat resistance and durability.

Meanwhile, in the low molecular weight styrene-acrylonitrile copolymer, a content of acrylonitrile may be in a range of about 15 wt % to 26 wt % and for example, may be in a range of about 18 wt % to 24 wt %. In the case that the content of acrylonitrile in the low molecular weight styrene-acrylonitrile copolymer is within the foregoing range, haze does not occur and a film having excellent transparency may be obtained. In the case that the content is excessively high, compatibility with the acrylic resin may deteriorate.

Next, the resin composition of the present invention includes the (3) ultra-high molecular weight styrene-acrylonitrile copolymer having a weight-average molecular weight of 1,000,000 or more.

The ultra-high molecular weight styrene-acrylonitrile copolymer is for improving toughness of the resin composition, and a content thereof may be in a range of about 1 wt % to 20 wt % based on the total content of the composition and for example, may be in a range of about 2 wt % to 10 wt %. In the case that the content of the ultra-high molecular weight styrene-acrylonitrile copolymer is less than 1 wt %, an effect of improving toughness may be insignificant, and in the case that the content of the ultra-high molecular weight styrene-acrylonitrile copolymer is greater than 20 wt %, melt viscosity of the resin composition may rapidly increase and thus, proccessability may decrease.

Meanwhile, in the ultra-high molecular weight styrene-acrylonitrile copolymer, a content of acrylonitrile may be in a range of about 15 wt % to 26 wt % and for example, may be in a range of about 18 wt % to 24 wt %. In the case that the content of acrylonitrile is within the foregoing range, haze does not occur and a film having excellent transparency may be obtained. In the case that the content is excessively high, compatibility with the acrylic resin may deteriorate.

In the low molecular weight and the ultra-high molecular weight styrene-acrylonitrile copolymers, the styrene unit may include substituted or non-substituted styrene and for example, may be styrene, alpha-methyl styrene, or vinyl phenol. However, the styrene unit is not limited thereto. In particular, in the case that an alpha-methyl styrene unit is included, an effect of improving heat resistance may increase.

The resin composition for an optical film of the present invention may be prepared by blending the foregoing components according to a method well-known in the art, such as a compounding method using a melt extruder. At this time, a thermal stabilizer, a lubricant, an antioxidant, and an ultraviolet (UV) stabilizer may be further added to the resin composition within a range of not deteriorating physical properties of the composition.

The resin composition for an optical film of the present invention as described above may be prepared as an optical film by using a method well-known in the art, such as a solution casting method or an extrusion method. For example, the resin composition may be vacuum-dried to remove moisture and dissolved oxygen, and the resin composition may then be supplied to a single or twin extruder having nitrogen substituted from a raw material hopper to the extruder. Raw material pellets may be obtained by melting the resin composition at a high temperature, the obtained raw material pellets may be vacuum-dried, the raw material pellets may be melted by using a single extruder having nitrogen substituted from the raw material hopper to the extruder and the melt may then be passed through a coat hanger type T-die, and a film may be prepared by being passed through a chromium plated casting roll or drying roll. The film thus prepared is biaxially stretched for manifesting retardation. At this time, a conditioner may be added if necessary.

Machine direction (MD) stretching and transverse direction (TD) stretching may be sequentially performed or may be simultaneously performed in the stretching process. Also, the stretching process may be performed in a single operation and may also be performed through multiple operations.

The stretching process may be performed at a temperature ranging from about Tg to about (Tg+20° C.) where Tg denotes a glass transition temperature of the resin composition, and for example, may be performed at a temperature ranging from about (Tg+2° C.) to about (Tg+15° C.). In the case that the stretching temperature is less than Tg, a fracture may occur, and in the case that the stretching temperature is greater than (Tg+20° C.), manifestation of retardation may decrease.

The glass transition temperature denotes a temperature range which starts from a temperature at which a storage modulus of the resin composition starts to decrease and becomes smaller than a loss modulus and ends at a temperature at which the orientation of a polymer chain is relaxed and disappears, and may be measured by a differential scanning calorimeter (DSC). In the present invention, a TD stretching ratio may be greater than an MD stretching ratio in order to adjust an in-plane slow axis of the optical film to a MD direction. More particularly, the MD stretching ratio may be in a range of 1.5 to 2.0. The TD stretching ratio may be in a range of about 2.0 to about 4.0. In the case that the MD stretching ratio is less than 1.5, toughness and TD tear strength may decrease, and in the case that the MD stretching ratio is greater than 2.0, manifestation of in-plane retardation may be greatly decreased. The stretching ratio denotes a ratio of a length after stretching to a length before stretching, i.e., (the length after stretching/the length before stretching). However, when the stretching ratio is calculated in an actual continuous process, a ratio of a roll speed after stretching to a roll speed before stretching is used as a stretching ratio with respect to a roll-to-roll MD stretching, and with respect to a TD stretching using a tenter, a ratio of an outlet width to an inlet width of the tenter is typically defined as a stretching ratio.

A stretching speed is not particularly limited. However, the stretching process may be performed at a stretching speed ranging from 1 m/min to 10 m/min with respect to a small sized stretching machine having a width of 800 mm or less and may be performed at a stretching speed ranging from 5 m/min to 80 m/min with respect to a stretching machine for mass production having a width of 800 mm or more.

The optical film of the present invention prepared according to the foregoing method is not particularly limited, but a final thickness thereof after stretching may be in a range of about 20 µm to 150 µm. In the case that the thickness of the film is less than 20 µm, device shrinkage, device cracks, and curls may be facilitated after lamination of the polarizing plates. Also, recently, a large number of integrated-type polarizing plates, in which a separate protective film is not used and a compensation film combines with a function of the protective film, have been prepared, and in the case that the integrated-type polarizing plate is used, it may be difficult to support a polarizer if the film is too thin. In the case that the thickness of the film is greater than 150 µm, a large amount of heat may be required for uniform stretching, and thus, it may be difficult to perform high-speed stretching as well as being uneconomical.

A degree of optical transmittance of the optical film is 90% or more, and a range of a haze value is 2.5% or less, may be 1% or less, and for example, may be 0.5% or less. In the case that the degree of optical transmittance of the optical film is less than 90% and the haze value is greater than 2.5%, brightness of a liquid crystal display having the optical film used therein may decrease.

The optical film of the present invention having the foregoing characteristics may be used as a compensation film for improving a viewing angle of an IPS mode liquid crystal display.

A stretched film must have an appropriate retardation value in order to compensate an IPS mode viewing angle and in the present film, the value may be controlled by adjusting the content of the styrene-acrylonitrile copolymer in the resin and stretching conditions such as stretching temperature and stretching ratio. For typical compensation of an IPS mode viewing angle, an in-plane retardation value ($R_{in}$) may be in a range of about 50 nm to about 200 nm and for example, may be in a range of about 70 nm to about 160 nm. Also, a thickness retardation value ($R_{th}$) of the optical film is equivalent to the in-plane retardation value in the case that only uniaxial stretching is performed, and in the case in which biaxial stretching is performed, the in-plane retardation value becomes low and the thickness retardation value becomes very high as values of stretching ratios in MD and TD directions are as close as possible. Typically, a ratio ($R_{th}/R_{in}$) of the in-plane retardation value to the thickness retardation value may be in a range of 1.0 to 2.5 and for example, may be in a range of 1.0 to 2.0.

Herein, the in-plane retardation value ($R_{in}$) denotes a value defined by the following Equation 1 and the thickness retardation value ($R_{th}$) denotes a value defined by the following Equation 2. Also, the measured reference wavelength of the in-plane retardation value and the thickness retardation value is 550 nm.

$$R_{in}=(n_x-n_y)\times d \qquad \text{[Equation 1]}$$

$$R_{th}=(n_z-n_y)\times d \qquad \text{[Equation 2]}$$

where $n_x$ is an in-plane refractive index of the film in a direction having the largest refractive index, $n_y$ is an in-plane refractive index of the film in a direction perpendicular to the $n_x$ direction, $n_z$ is a thickness refractive index, and d is a thickness of the film.

Mode for Invention

Hereinafter, the present invention will be described in more detail, according to specific examples.

<Methods of Evaluating Physical Properties>

1. Retardation: retardation of a film was measured by using the AxoScan by Axometrics, Inc.

2. Transmittance and Haze: measured by using a hazemeter (Murakami, HM-150).

3. Toughness: measured according to the presence of occurrence of fracture when the film was bent in MD and TD directions and pressed by hand. A case of no fracture occurring during 5 tests was evaluated as excellent, a case of 1 fracture occurring was evaluated as good, and a case of 2 or more fractures occurring was evaluated as a failure.

EXAMPLE 1

A resin composition was prepared through compounding poly(cyclohexylmaleimide-co-methyl methacrylate) (LGMMA, PMMA830HR), a styrene-acrylonitrile copolymer having a weight-average molecular weight of 120,000 (LG Chem, Ltd., SAN80HF, acrylonitrile content of 24 wt %), and an ultra-high molecular weight styrene-acrylonitrile copolymer having a weight-average molecular weight of 6,200,000 (Chemtura, Blendex-869, acrylonitrile content of 24 wt %) at a weight ratio of 85:15:5 by using a twin extruder under conditions of 250° C. and 200 rpm.

An unstretched film having a width of 800 mm was prepared with the resin composition by using a T-die film forming machine under conditions of 250° C. and 250 rpm. The unstretched film was stretched 1.4 times at a temperature of Tg+5° C. in a MD direction by using a roll-to-roll method and then stretched 2.8 times at the same temperature in a TD direction by using a tenter stretching machine. Retardation values, transmittance, haze, and toughness of the final stretched film obtained were measured and the measurement results are presented in Table 1. As described in Table 1, the stretched film had high retardation values, $R_{in}$ and $R_{th}$, of 113 nm and 169 nm, and transmittance and haze were also good. In particular, the film was not fractured when the film was bent in both MD and TD directions, and thus, it was confirmed that toughness was also excellent.

EXAMPLE 2

A stretched film was prepared in the same manner as Example 1 except that PMMA 830HR, SAN80HF, and ultra-high molecular weight Blendex-869 were compounded in a weight ratio of 79:18:3, and retardation values, transmittance, haze, and toughness were measured. The measurement results are presented in Table 1. As described in Table 1, retardation values, optical properties, and toughness were good.

EXAMPLE 3

A stretched film was prepared in the same manner as Example 1 except that PMMA 830HR, SAN82TR, and ultra-high molecular weight Blendex-869 were compounded in a weight ratio of 80:15:5 by using SAN82TR (LG Chem. Ltd., acrylonitrile content of 19 wt %) as a styrene-acrylonitrile copolymer instead of SAN80HF and stretching ratios in MD and TD directions were respectively controlled to be 1.6 and 3.2. Retardation values, transmittance, haze, and toughness were measured. The measurement results are presented in Table 1. As described in Table 1, retardation values, optical properties, and toughness were good.

COMPARATIVE EXAMPLE 1

A biaxially stretched film was prepared by film forming/stretching in the same manner as Example 1 except that PMMA 830HR and SAN80HF were only compounded in a weight ratio of 78:22 without using an ultra-high molecular weight copolymer Blendex-869 and stretching ratios in MD and TD directions were respectively controlled to be 1.5 and 3.0. Retardation values, transmittance, haze, and toughness were measured. The measurement results are presented in Table 1. As described in Table 1, the film exhibited excellent optical properties but film toughness was insufficient, and thus, a fracture was facilitated in the TD direction.

COMPARATIVE EXAMPLE 2

A stretched film was prepared in the same manner as Example 1 except that PMMA 830HR, SAN80HF, and ultra-high molecular weight Blendex-869 were compounded in a weight ratio of 93:4:3 and stretching ratios in MD and TD directions were respectively controlled to be 1.5 and 3.0. Retardation values, transmittance, haze, and toughness were measured. The measurement results are presented in Table 1. As described in Table 1, transparency and toughness were good but retardation was not greatly manifested.

TABLE 1

| | Stretching ratio | | Thickness | Tg | Retardation | | | Degree of optical transmittance | Haze | Toughness |
| --- | --- | --- | --- | --- | --- | --- | --- | --- | --- | --- |
| | MD | TD | (μm) | (° C.) | $R_{in}$ (nm) | $R_{th}$ (nm) | $R_{th}/R_{in}$ | (%) | (%) | evaluation* |
| Example 1 | 1.4 | 2.8 | 56 | 120 | 113 | 169 | 1.49 | 93.3 | 0.2 | ◎ |
| Example 2 | 1.4 | 2.8 | 57 | 120 | 121 | 183 | 1.51 | 93.5 | 0.2 | ○ |
| Example 3 | 1.6 | 3.2 | 52 | 119 | 106 | 174 | 1.62 | 93.8 | 0.1 | ◎ |
| Comparative Example 1 | 1.5 | 3.0 | 56 | 119 | 109 | 182 | 1.60 | 93.8 | 0.2 | X |
| Comparative Example 2 | 1.5 | 3.0 | 54 | 123 | 52 | 82 | 1.57 | 93.4 | 0.2 | ○ |

While the present invention has been shown and described in connection with the embodiments, it will be apparent to those skilled in the art that modifications and variations can be made without departing from the spirit and scope of the invention as defined by the appended claims.

The invention claimed is:

1. An optical film prepared by biaxial stretching of a composition, the composition comprising:
    40 wt % to 94 wt % of an acrylic resin;
    5 wt % to 40 wt % of a styrene-acrylonitrile copolymer having a weight-average molecular weight less than 1,000,000; and
    1 wt % to 20 wt % of an ultra-high molecular weight styrene-acrylonitrile copolymer having a weight-average molecular weight ranging from 1,000,000 to 9,000,000,
    wherein a thickness of the optical film is in a range of 20 μm to 150 μm; and
    wherein the optical film has an optical transmittance of 90% or more and a haze value of 2.5% or less;
    wherein an in-plane retardation value of the optical film is in the range of 50 nm to 200 nm;
    wherein a thickness retardation value of the optical film is in the range of 50 nm to 400 nm;
    wherein a value of $R_{th}/R_{in}$ of the optical film is in the range of 1.0 to 2.0; and
    wherein the in-plane retardation value ($R_{in}$) denotes a value defined by the following Equation 1 and the thickness retardation value ($R_{th}$) denotes a value defined by the following Equation 2:

$$R_{in}=(n_x-n_y)\times d \quad \text{[Equation 1]}$$

$$R_{th}=(n_z-n_y)\times d \quad \text{[Equation 2]}$$

in Equations 1 and 2,
$n_x$ is an in-plane refractive index of the film in a direction having the largest refractive index, $n_y$ is an in-plane refractive index of the film in a direction perpendicular to the $n_x$ direction, $n_z$ is a thickness refractive index, d is a thickness of the film, and the measured reference wave-length of the in-plane retardation value and the thickness retardation value is 550 nm.

2. The optical film of claim 1, wherein a content of acrylonitrile in the styrene-acrylonitrile copolymer having a weight-average molecular weight less than 1,000,000 is in a range of 15 wt % to 26 wt %.

3. The optical film of claim 1, wherein a content of acrylonitrile in the ultra-high molecular weight styrene-acrylonitrile copolymer is in a range of 15 wt % to 26 wt %.

4. The optical film of claim 1, wherein the acrylic resin is a copolymer of a (meth)acryl-based monomer and a cyclic based monomer.

5. The optical film of claim 4, wherein the cyclic based monomer is maleic anhydride, maleimide, glutaric acid anhydride, glutarimide, lactam, or a derivative thereof.

6. The optical film of claim 1, wherein the styrene-acrylonitrile copolymer having a weight-average molecular weight less than 1,000,000 comprises an alpha-methyl styrene unit.

7. The optical film of claim 1, wherein the ultra-high molecular weight styrene-acrylonitrile copolymer having a weight-average molecular weight ranging from 1,000,000 to 9,000,000 comprises an alpha-methyl styrene unit.

8. The optical film of claim 1, wherein the acrylic resin comprises an alpha-methyl styrene unit.

9. The optical film of claim 1, wherein the stretching is performed at a temperature ranging from Tg to (Tg+20° C.).

10. The optical film of claim 1, wherein the biaxial stretching is performed at a machine direction (MD) stretching ratio ranging from 1.5 to 2.0 and at a transverse direction (TD) stretching ratio ranging from 2.0 to 4.0.

11. A polarizing plate for in-plane switching (IPS)-liquid crystal display (LCD) compensation comprising the optical film of claim 1.

* * * * *